US012807044B2

(12) United States Patent
Kimura et al.

(10) Patent No.: US 12,807,044 B2
(45) Date of Patent: Nov. 24, 2026

(54) EASY CHAIR AND VEHICLE SEAT

(71) Applicant: TOYOTA BOSHOKU KABUSHIKI KAISHA, Aichi (JP)

(72) Inventors: Masahide Kimura, Tajimi (JP); Haruki Iwama, Nisshin (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 170 days.

(21) Appl. No.: 18/806,054

(22) Filed: Aug. 15, 2024

(65) Prior Publication Data

US 2025/0065780 A1 Feb. 27, 2025

(30) Foreign Application Priority Data

Aug. 23, 2023 (JP) ................................ 2023-135654

(51) Int. Cl.

| | |
|---|---|
| ***B60N 2/12*** | (2006.01) |
| ***B60N 2/02*** | (2006.01) |
| ***B60N 2/18*** | (2006.01) |
| ***B60N 2/68*** | (2006.01) |

(52) U.S. Cl.

CPC ........... *B60N 2/12* (2013.01); *B60N 2/02253* (2023.08); *B60N 2/1803* (2013.01); *B60N 2/1842* (2013.01); *B60N 2/1853* (2013.01); *B60N 2/68* (2013.01)

(58) Field of Classification Search

CPC ...... B60N 2/12; B60N 2/10; B60N 2002/126; B60N 2/164; B60N 2/1803; B60N 2/1853

USPC ..................................................... 297/344.17

See application file for complete search history.

(56) References Cited

U.S. PATENT DOCUMENTS

| | | | | |
|---|---|---|---|---|
| 2009/0230752 | A1* | 9/2009 | Adragna .............. | B60N 2/1615 403/24 |
| 2012/0261963 | A1* | 10/2012 | Heyer .................... | B60N 2/164 297/313 |
| 2020/0391622 | A1* | 12/2020 | Kajino ................. | B60N 2/1814 |
| 2024/0157861 | A1* | 5/2024 | Scheede ............... | B60N 2/1853 |
| 2024/0198867 | A1* | 6/2024 | Zhang .................... | B60N 2/181 |
| 2024/0343166 | A1* | 10/2024 | Ewald ................ | B60N 2/02253 |
| 2025/0115170 | A1* | 4/2025 | Lee .................... | B60N 2/02246 |
| 2025/0206201 | A1* | 6/2025 | Jung ........................ | B60N 2/10 |

FOREIGN PATENT DOCUMENTS

CN 218892464 U 4/2023

* cited by examiner

*Primary Examiner* — Alfred J Wujciak
(74) *Attorney, Agent, or Firm* — GREENBLUM & BERNSTEIN, P.L.C.

(57) ABSTRACT

Disclosed is one example of an easy chair capable of inhibiting links from being deformed and damaged when a large load acts on a cushion frame. A posture-changing mechanism of the easy chair includes a first link, a second link, and a male threaded rod, and these form a truss structure. Thus, in principle, no large bending moment is generated in the first link, the second link, and the male threaded rod. This posture-changing mechanism makes it possible to inhibit the first link, the second link, and the male threaded rod from being deformed and damaged by a bending moment when a large load acts on the cushion frame.

5 Claims, 7 Drawing Sheets

EASY CHAIR AND VEHICLE SEAT

CROSS-REFERENCE TO RELATED APPLICATIONS

This application claims the benefit of Japanese Patent Application No. 2023-135654 filed on Aug. 23, 2023 with the Japan Patent Office, the entire disclosure of which is incorporated herein by reference.

BACKGROUND

The present disclosure relates to an easy chair and a vehicle seat in which a posture of a cushion frame is displaceable.

For example, in a vehicle seat disclosed in Chinese Utility Model Gazette No. 218892464 (hereinafter referred to as Patent Document 1), a lower end of a first link is rotatably coupled to a fixing bracket fixed to a movable rail of a sliding device, a first end of a second link is rotatably coupled to an upper end of the first link, a second end of the second link is rotatably coupled to a cushion frame, and an angle formed between the first link and the second link is changed by an actuator to thereby change a posture of the cushion frame.

SUMMARY

In the vehicle seat disclosed in Patent Document 1, the posture of the cushion frame is changed by changing the angle formed between the first link and the second link by the actuator. Thus, when a large load acts on the cushion frame, a large bending moment is liable to be generated in the first link and the second link.

Accordingly, in the vehicle seat disclosed in Patent Document 1, when a large load acts on the cushion frame, the first link and the second link may be deformed and damaged. The present disclosure discloses one example of an easy chair conceived in view of such a point.

It is desirable that an easy chair comprise, for example: a cushion frame; and a posture-changing mechanism configured to displace the cushion frame between a comfort-providing posture in which a front end side of the cushion frame is raised to be higher than a rear end side thereof and a regular posture in which the front end side is lower than that in the comfort-providing posture, the posture-changing mechanism including a first link, a second link, a male threaded rod, and an electric motor configured to rotate a nut that is threadedly engaged with the male threaded rod.

Moreover, it is desirable that a first longitudinal end of the first link be rotatably coupled to a fixing bracket, that a second longitudinal end of the first link and a first longitudinal end of the second link be rotatably coupled to each other, that a second longitudinal end of the second link and a first longitudinal end of the male threaded rod be rotatably coupled to each other, and that the electric motor be rotatably supported by the first link or the fixing bracket.

Furthermore, it is desirable that a shape obtained by connecting a support point for the electric motor, a first coupling point, and a second coupling point to each other form a triangle constantly, and that the cushion frame be coupled to the second link. The first coupling point is a point where the first link and the second link are coupled together. The second coupling point is a point where the second link and the male threaded rod are coupled together.

Thus, in the posture-changing mechanism of the easy chair, the first link, the second link, and the male threaded rod form a truss structure. This results in generating no large bending moment in the first link, the second link, and the male threaded rod, in principle.

Accordingly, such a posture-changing mechanism makes it possible to inhibit the first link, the second link, and the male threaded rod from being deformed and damaged by the bending moment when a large load acts on the cushion frame.

The easy chair may have a below-described configuration, for example. It is desirable that a point where the second link and the cushion frame are coupled together be located between the first coupling point and the second coupling point in the second link.

Thus, a required force to displace the male threaded rod and an axial force to act on the male threaded rod do not have to be excessively larger, and an amount of rising displacement of the cushion frame is larger.

It is desirable that the cushion frame include: a first side frame that is arranged on a first end side in a seat width direction and that extends in a seat front-rear direction; a second side frame that is arranged on a second end side in the seat width direction and that extends in the seat front-rear direction; and a coupling member that extends in the seat width direction and that couples the first side frame and the second side frame to each other, and it is desirable that the posture-changing mechanism be arranged on a side where the first side frame is located, that a third link, a fourth link, and a second fixing bracket be provided on a side where the second side frame is located, that a first longitudinal end of the third link be rotatably coupled to the second fixing bracket, that a second longitudinal end of the third link and a first longitudinal end of the fourth link be rotatably coupled to each other, and that the second link and the fourth link be configured to be movable as one piece with the coupling member.

Thus, even when a large load acts on the side where the second side frame is located, energy of such load is also transmitted to the side where the first side frame is located via the coupling member. This results in dispersing the load, thus enabling securement of a sufficient rigidity.

It is desirable that the electric motor be supported by the first link, and that the support point be located on a side where the fixing bracket is located relative to a midpoint of a line segment connecting a point where the first link and the fixing bracket are coupled together to the first coupling point.

This results in inhibiting a large displacement of the center of gravity of the electric motor in the up-down direction even when the male threaded rod is displaced greatly in its axial direction. Accordingly, the electric motor, which is an article having a comparatively large mass, can be inhibited from being displaced greatly.

when a point where the second link and the cushion frame are coupled together is referred to as a third coupling point, it is desirable that the first coupling point be located above the third coupling point when the cushion frame is in the regular posture, and that the first coupling point be located below the third coupling point when the cushion frame is in the comfort-providing posture.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

Figure 1:
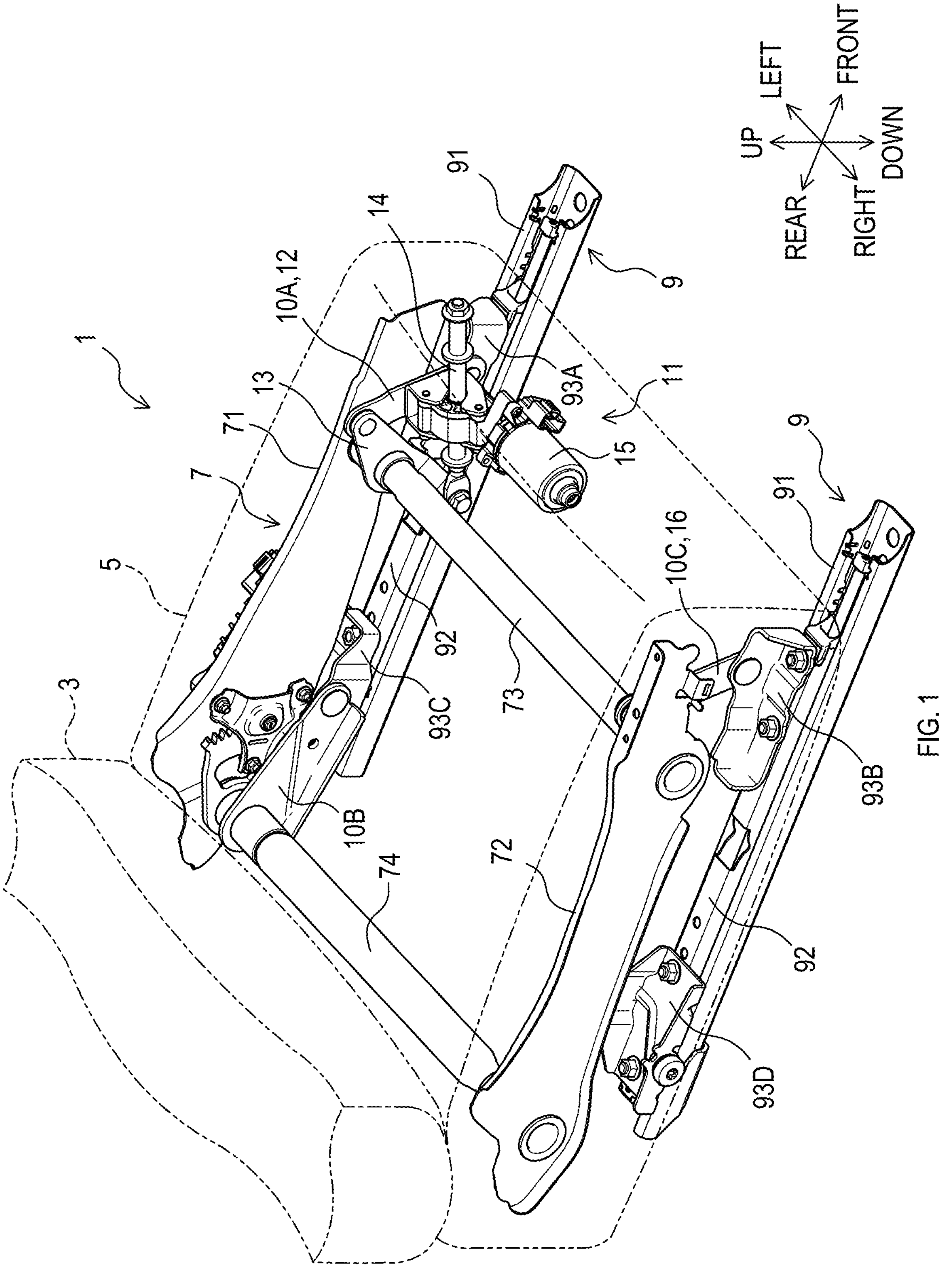
FIG. 1 is a diagram showing a vehicle seat according to an embodiment.

Below-described "embodiments of the invention" show examples of the embodiments that fall within the technical scope of the present disclosure. That is, invention-specifying matters and so on recited in the appended claims are not limited by specific configurations, structures, and so on indicated in the embodiments below.

The embodiments below are examples of a vehicle seat to be mounted in a vehicle, such as an automobile. The vehicle seat corresponds to an example of an easy chair. Arrows indicating directions, hatched lines, and so on shown in the drawings are provided for the purpose of easier understanding of mutual relationships between the drawings, shapes of members or portions, and so on.

Thus, the vehicle seat is not limited by the directions shown in the drawings. The directions shown in the drawings are directions in a state where the vehicle seat according to the embodiments below is mounted in the automobile. The drawings provided with hatched lines do not necessarily represent sectional views.

A member or a portion described at least with a reference numeral is at least one in number except in a case of being accompanied by a restrictive wording such as "only one". In other words, the member or the portion may be two or more in number in a case of not being accompanied by the restrictive wording such as "only one". The vehicle seat indicated in the present disclosure comprises at least one of (i) an element such as the member or the portion described at least with a reference numeral or (ii) a structural portion shown in the drawings.

<1. Overview of Vehicle Seat>

As shown in FIG. 1, a vehicle seat 1 comprises a seatback 3, a seat cushion 5, and a posture-changing mechanism 11. The seatback 3 supports an occupant's back. The seat cushion 5 supports the occupant's buttocks.

The seat cushion 5 comprises a cushion pad (not shown) and a cushion frame 7. The cushion pad is a cushioning member formed of an elastic material, such as foamed urethane.

The cushion frame 7 is a frame member that forms a framework of the seat cushion 5. The cushion frame 7 comprises a first side frame 71, a second side frame 72, a first coupling member 73, and a second coupling member 74.

The first side frame 71 is arranged on a first end side in a seat width direction, that is, on a first end side in a left-right direction, and extends in a seat front-rear direction. The second side frame 72 is arranged on a second end side in the seat width direction, and extends in the seat front-rear direction.

The first coupling member 73 and the second coupling member 74 extend in the seat width direction, and couple the first side frame 71 and the second side frame 72 to each other. The first coupling member 73 couples a front end part of the first side frame 71 and a front end part of the second side frame 72 to each other. The second coupling member 74 couples a rear end part of the first side frame 71 and a rear end part of the second side frame 72 to each other.

The first coupling member 73 is coupled to the side frame 71 and the side frame 72 so as to be rotatable relative thereto about a central axis of the first coupling member 73. Similarly, the second coupling member 74 is coupled to the side frame 71 and the side frame 72 so as to be rotatable relative thereto about a central axis of the second coupling member 74.

The first side frame 71, the second side frame 72, the first coupling member 73, and the second coupling member 74 are made of a metal, such as a cold-rolled steel sheet. The cushion frame 7 is coupled and fixed to the vehicle via two sliding devices 9.

The sliding devices 9 support the cushion frame 7, that is, the vehicle seat 1, such that it is slidable relative to the vehicle. The sliding devices 9 each comprise a fixed rail 91 and a movable rail 92.

The fixed rail 91 is fixed to the vehicle so as to be immovable relative thereto. The movable rail 92 is slidable relative to the corresponding fixed rail 91. On one of the movable rails 92, fixing brackets 93A and 93C are provided, and on the other one, fixing brackets 93B and 93D are provided.

Figure 2:
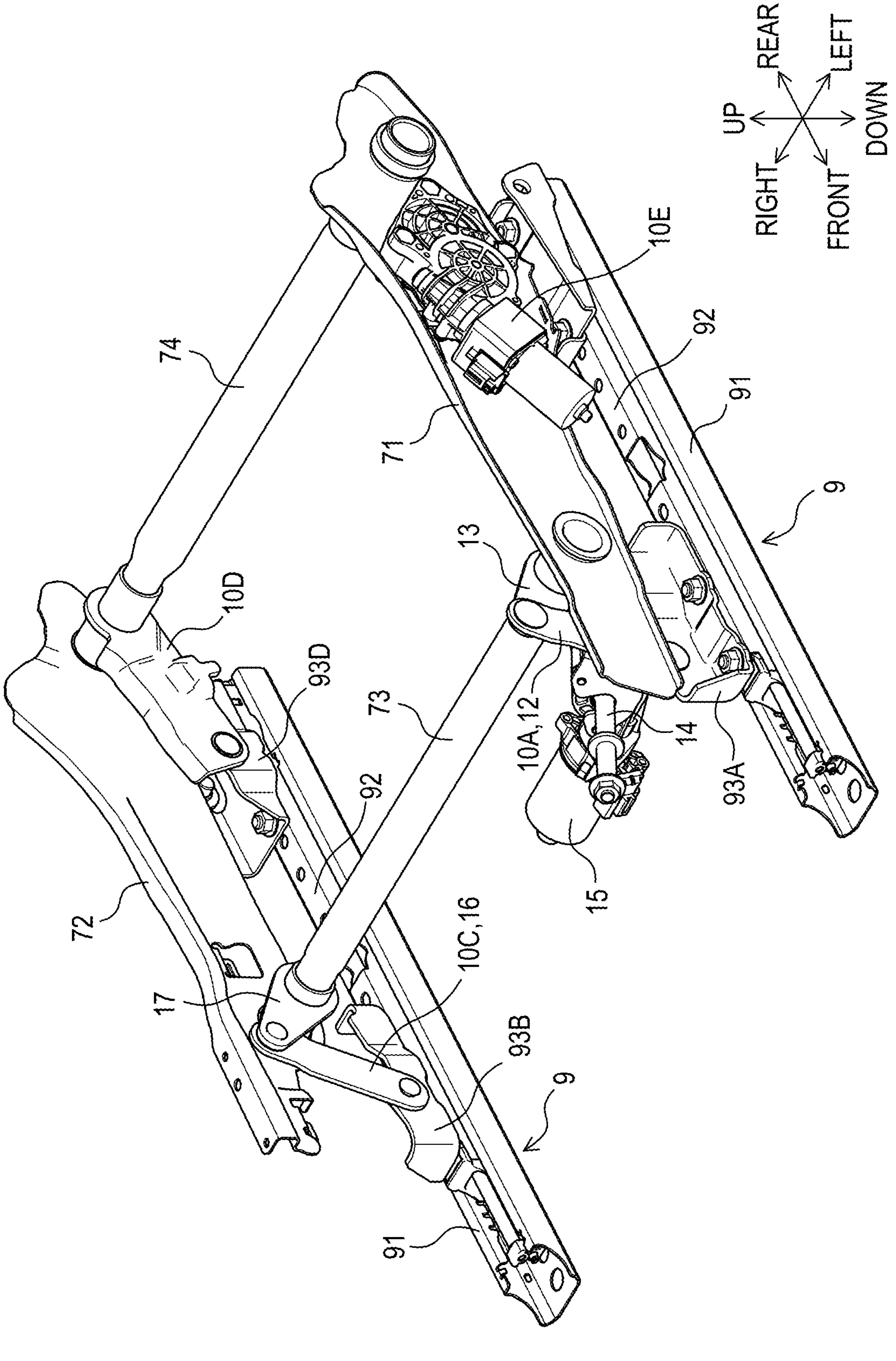
FIG. 2 is a diagram showing a cushion frame according to the embodiment.

As shown in FIGS. 1 and 2, the cushion frame 7 is coupled to the fixing brackets 93A and 93C via lifter links 10A and 10B, respectively, and is coupled to the fixing brackets 93B and 93D via lifter links 10C and 10D, respectively. The lifter links 10A to 10D are part of a mechanism (lifter mechanism) to displace the cushion frame 7 in an up-down direction.

An electric motor 10E (see FIG. 2) is an actuator for actuating the lifter links 10A to 10D. Upon activation of the electric motor 10E, the lifter links 10A to 10D each pivotally move about an axis passing through the corresponding one of the fixing brackets 93A to 93D.

That is, the positions of the fixing brackets 93A to 93D are reference positions in displacing the cushion frame 7. In other words, the cushion frame 7 is displaced with the positions of the fixing brackets 93A to 93D as immovable positions.

<2. Posture-Changing Mechanism>

<2.1 Configuration of Posture-Changing Mechanism>

Figure 3:
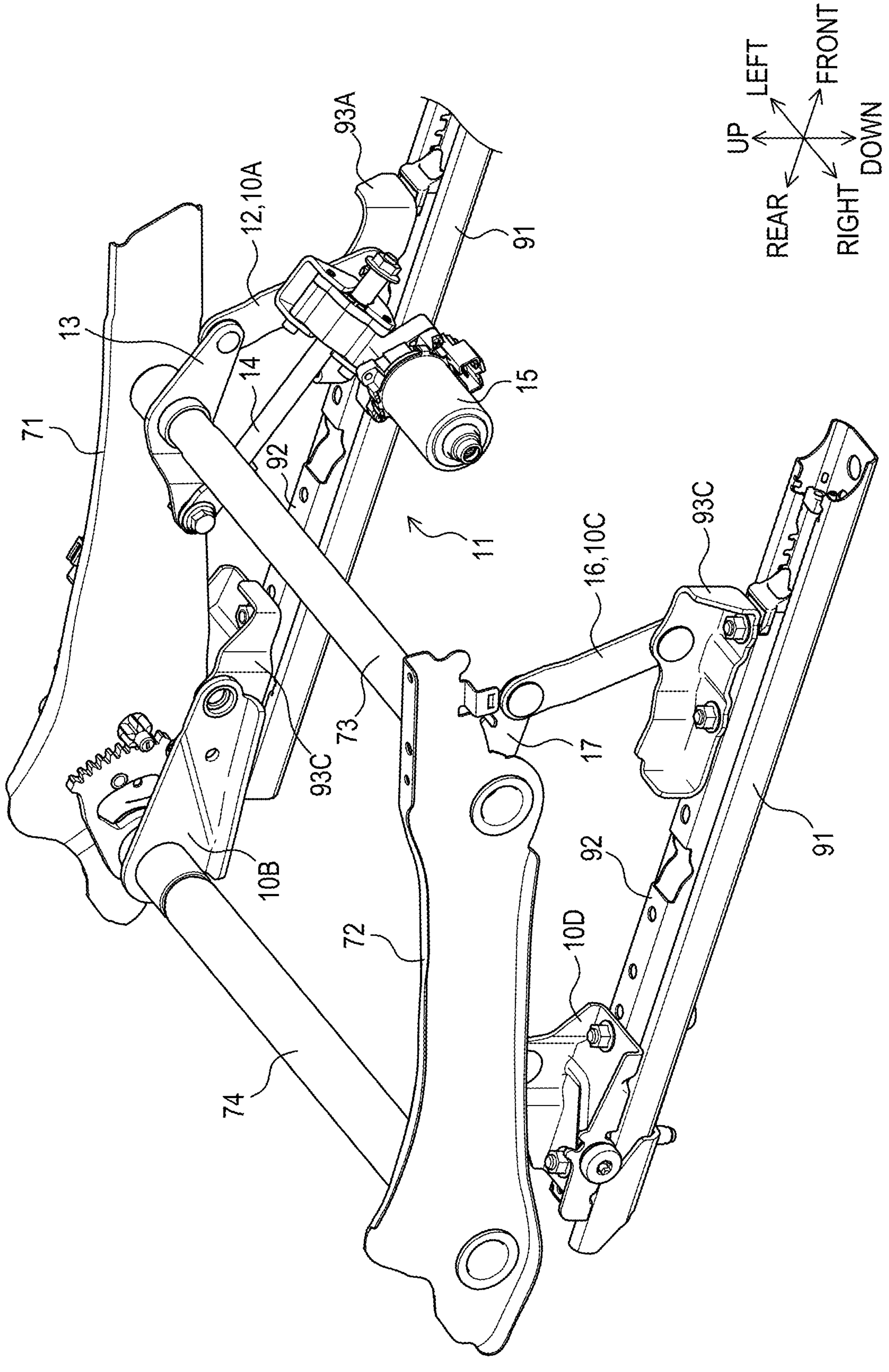
FIG. 3 is a diagram showing the cushion frame according to the embodiment.

The posture-changing mechanism 11 is a mechanism for displacing the cushion frame 7 between a comfort-providing posture and a regular posture. The comfort-providing posture refers to a posture in which a front end side of the cushion frame 7 is raised to be higher than a rear end side thereof (see FIG. 3).

The regular posture refers to a posture in which the front end side of the cushion frame 7 is lower than that in the comfort-providing posture (see FIG. 1). The posture-changing mechanism 11 is arranged on the side where the first side frame 71 is located.

Figure 4:
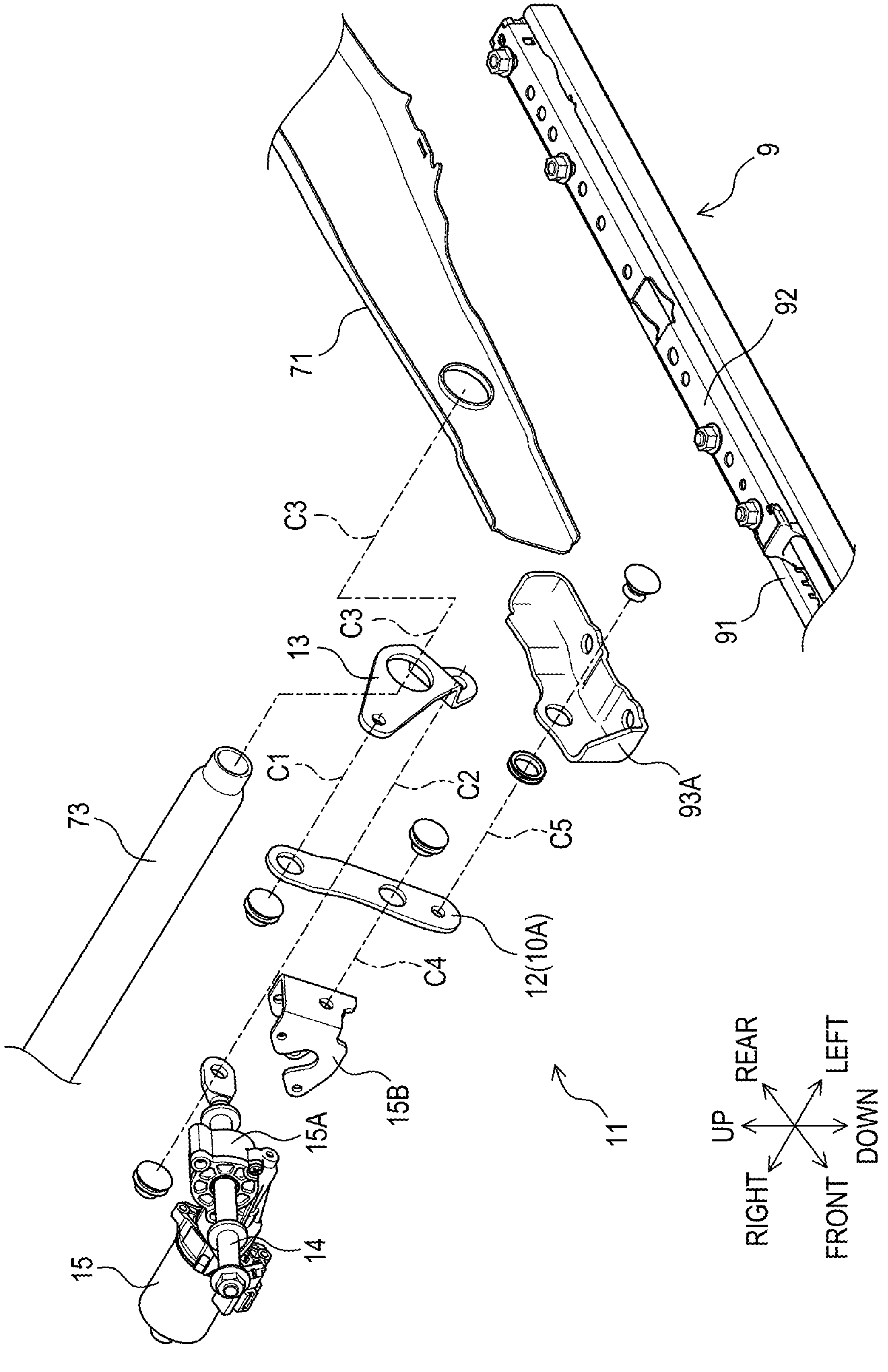
FIG. 4 is an exploded view of a posture-changing mechanism according to the embodiment.

As shown in FIG. 4, the posture-changing mechanism 11 comprises a first link 12, a second link 13, a male threaded rod 14, a nut (not shown), and an electric motor 15. The nut is a rotational body that is housed rotatably in a casing 15A and that contains a female threaded hole to be threadedly engaged with the male threaded rod 14.

The electric motor 15 generates a rotational force to rotate the nut. Thus, when the electric motor 15 is activated to rotate the nut, the male threaded rod 14 is displaced relative to the casing 15A in a direction parallel to a longitudinal direction of the male threaded rod 14 based on the principle of a screw.

Figure 5:
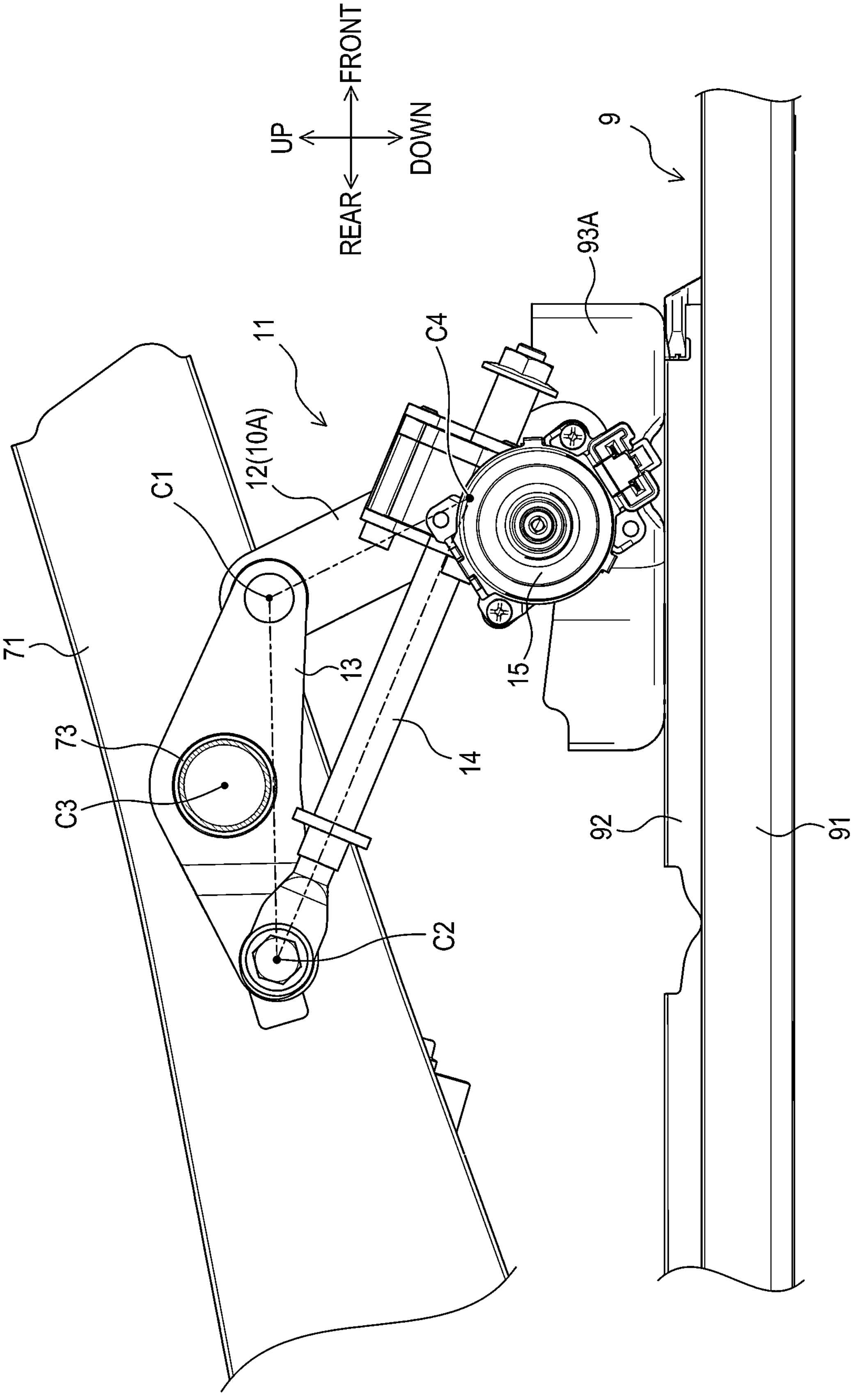
FIG. 5 is a diagram showing the posture-changing mechanism according to the embodiment.
Figure 6:
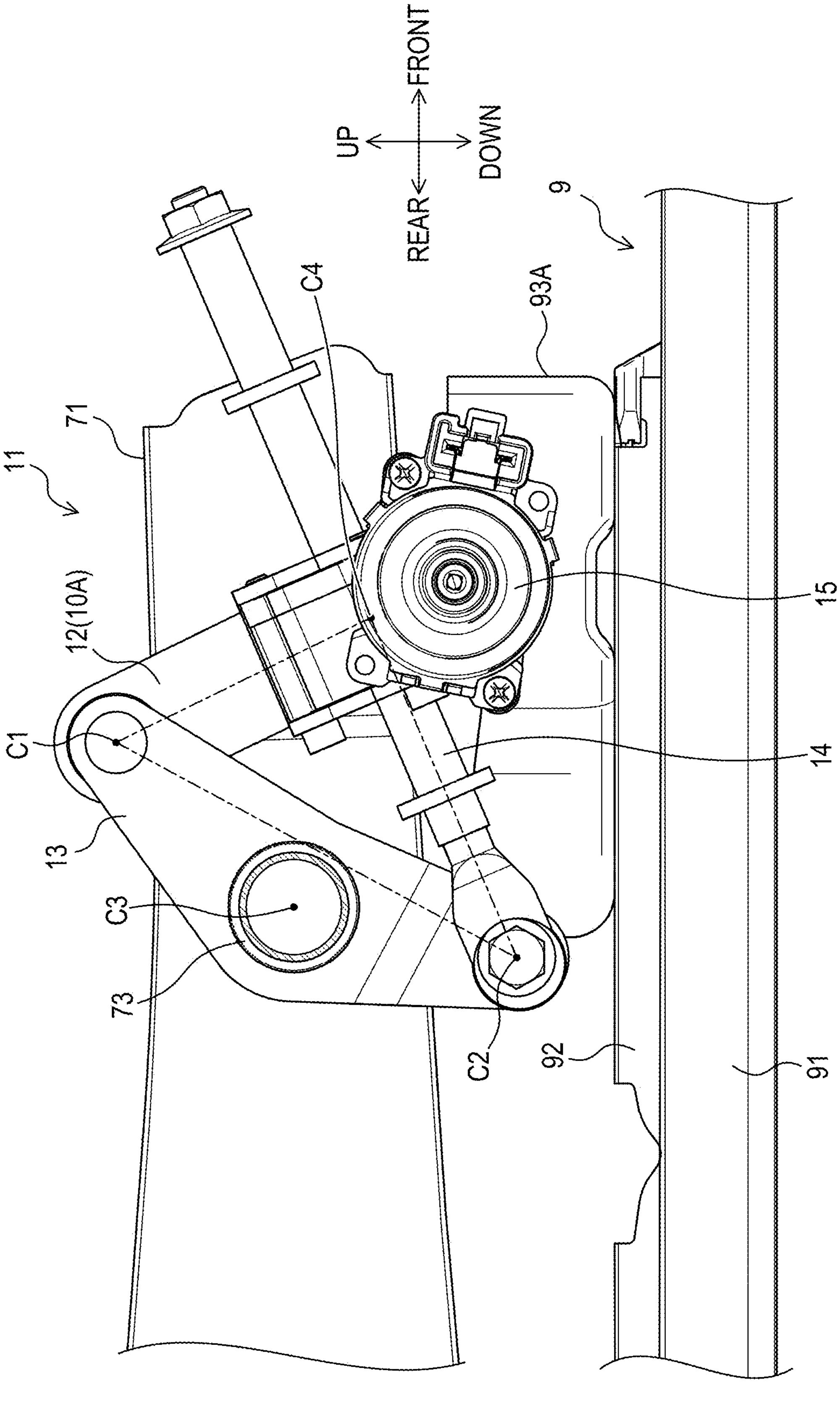
FIG. 6 is a diagram showing the posture-changing mechanism according to the embodiment.
Figure 7:
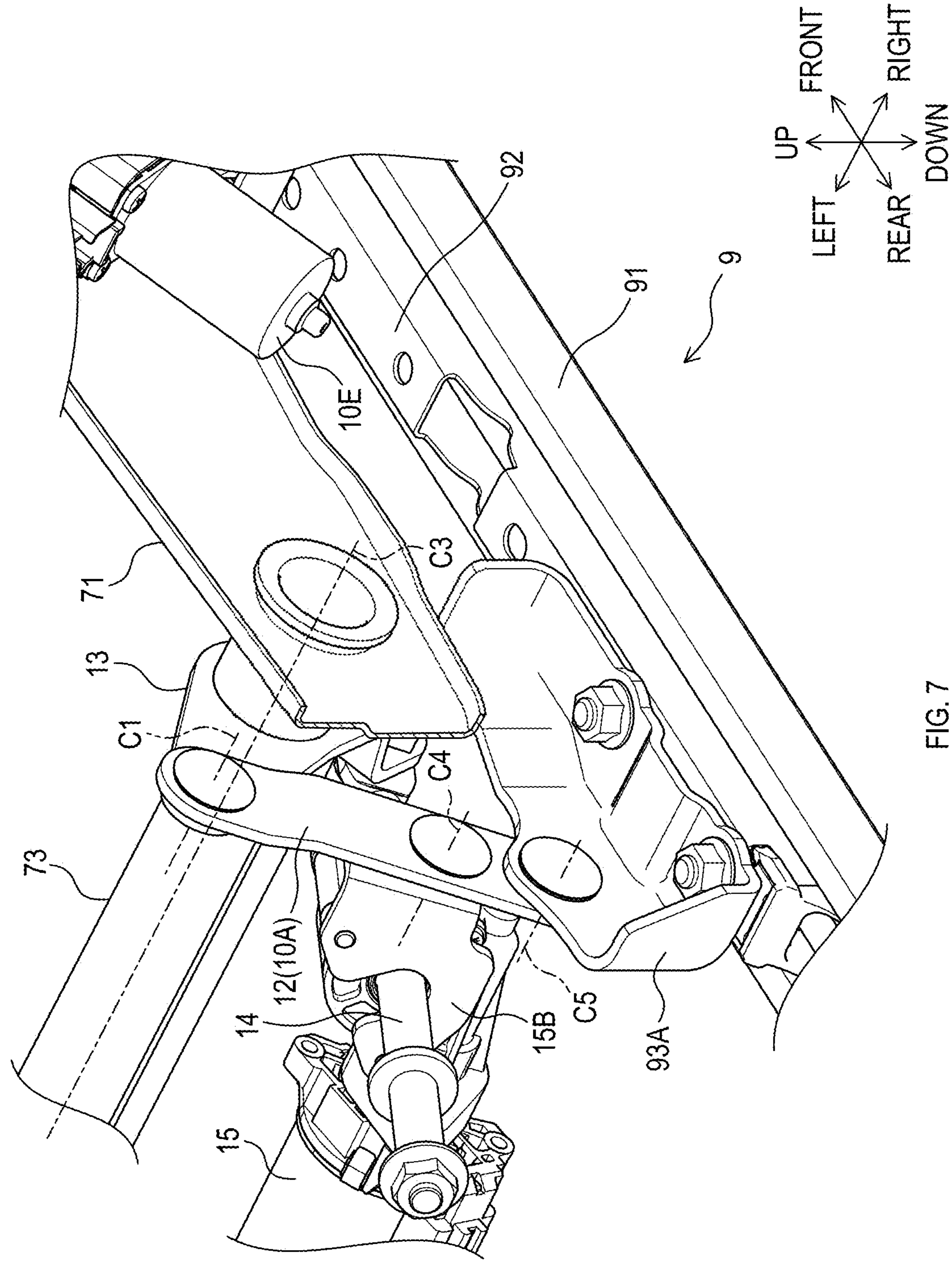
FIG. 7 is a diagram showing the posture-changing mechanism according to the embodiment.

As shown in FIGS. 5 to 7, a first longitudinal end of the first link 12 is rotatably coupled to the fixing bracket 93A. A second longitudinal end of the first link 12 and a first longitudinal end of the second link 13 are rotatably coupled to each other.

The first link 12 also functions as the lifter link 10A. In other words, in the present embodiment, the first link 12 and the lifter link 10A are configured with the same member.

A second longitudinal end of the second link 13 is rotatably coupled to a first longitudinal end of the male threaded rod 14. A point where the first link 12 and the second link 13 are coupled together is hereinafter referred to as a first coupling point C1. A point where the second link 13 and the male threaded rod 14 are coupled together is hereinafter referred to as a second coupling point C2.

The electric motor 15 is rotatably supported by the first link 12 or the fixing bracket 93A (by the first link 12, in the present embodiment). Specifically, the electric motor 15 is rotatably supported by the first link 12 via a mounting bracket 15B.

A support point C4 for the electric motor 15 is located on the side where the fixing bracket 93A is located relative to a midpoint of a line segment connecting a coupling point C5 (see FIG. 7) where the first link 12 and the fixing bracket 93A are coupled together to the first coupling point C1. The midpoint refers to a point that divides the length of the line segment into halves.

As shown in FIGS. 5 and 6, a shape obtained by connecting the first coupling point C1, the second coupling point C2, and the support point C4 to each other forms a triangle constantly. The cushion frame 7 (the first side frame 71, in the present embodiment) is coupled to the second link 13.

Specifically, as shown in FIG. 7, the second link 13 is coupled to the cushion frame 7 via the first coupling member 73. A point where the second link 13 and the cushion frame 7 are coupled together is hereinafter referred to as a third coupling point C3. The third coupling point C3 is located on the central axis of the first coupling member 73.

When the cushion frame 7 is in the regular posture, as shown in FIG. 6, the first coupling point C1 is located above the third coupling point C3. When the cushion frame 7 is in the comfort-providing posture, as shown in FIG. 5, the first coupling point C1 is located below the third coupling point C3.

<2.2 Configuration on Second-Side-Frame Side>

As shown in FIG. 2, on the side where the second side frame 72 is located, a third link 16, a fourth link 17, and a fixing bracket 93B are provided. In other words, the configuration on the side of the second side frame 72 is such that actuators, such as the male threaded rod 14 and the electric motor 15, are removed from the posture-changing mechanism 11.

Specifically, the third link 16 corresponds to the first link 12, the fourth link 17 corresponds to the second link 13, and the fixing bracket 93B corresponds to the fixing bracket 93A. A first longitudinal end of the third link 16 is rotatably coupled to the fixing bracket 93B.

A second longitudinal end of the third link 16 is rotatably coupled to a first longitudinal end of the fourth link 17. The third link 16 also functions as the lifter link 10C.

The second link 13 and the fourth link 17 are configured to be movable as one piece with the first coupling member 73. Specifically, the second link 13 and the fourth link 17 are each fixed to the first coupling member 73 by welding. Thus, the second link 13 and the fourth link 17 rotate together integrally with the first coupling member 73.

<2.3 Operation of Posture-Changing Mechanism>

The vehicle seat 1 is provided with a controller (not shown) to control operation of the electric motors 15 and 10E, and a posture selector switch (not shown) to select a posture of the vehicle seat 1.

When a user operates the posture selector switch to select the comfort-providing posture, the controller first activates the electric motor 10E to place the lifter links 10A to 10D in respective postures set in advance. Next, the controller activates the electric motor 15 to place the first side frame 71 and the second side frame 72 in the comfort-providing posture (see FIG. 5).

In the vehicle seat 1, when the vehicle seat 1 assumes the comfort-providing posture, the electric motor 10E, and accordingly the lifter links 10A to 10D, enter an inoperable state. This is because operation of the lifter links 10A to 10D with the comfort-providing posture maintained may cause interference between any parts.

<3. Characteristic Features of Vehicle Seat>

(1a) In the posture-changing mechanism 11 of the vehicle seat 1, the first link 12, the second link 13, and the male threaded rod 14 form a truss structure (see FIGS. 5 and 6). Thus, in principle, no large bending moment is generated in the first link 12, the second link 13, and the male threaded rod 14.

Accordingly, this posture-changing mechanism 11 makes it possible to inhibit the first link 12, the second link 13, and the male threaded rod 14 from being deformed and damaged by the bending moment when a large load acts on the cushion frame 7.

In the present embodiment, the second link 13 and the cushion frame 7 are coupled to each other at an intermediate part of the second link 13 in a longitudinal direction thereof, and thus, a bending moment due to simple support at both ends is generated in the second link 13.

However, a geometrical moment of inertia in this intermediate part, that is, in the third coupling point C3, is sufficiently large as compared with that in other parts, and thus, the second link 13 is inhibited from being deformed greatly by this bending moment. The geometrical moment of inertia refers to a rigidity against the moment about an axis in the seat width direction.

(1b) In the posture-changing mechanism 11, the third coupling point C3 where the second link 13 and the cushion frame 7 are coupled together is located between the first coupling point C1 and the second coupling point C2 in the second link 13 (see FIGS. 5 and 6).

Thus, a required force to displace the male threaded rod 14 and an axial force to act on the male threaded rod 14 do not have to be excessively larger, and an amount of rising displacement of the cushion frame 7 is larger.

If the third coupling point C3 where the second link 13 and the cushion frame 7 are coupled together should coincide in position with the second coupling point C2, a distance from the first coupling point C1 to the second coupling point C2 would be smaller. This would result in excessive increase in the required force to displace the male threaded rod 14 and in the axial force to act on the male threaded rod 14.

(1c) The electric motor 15 is supported by the first link 12, and the support point C4 for the electric motor 15 is located on the side where the fixing bracket 93A is located relative to the midpoint of the line segment connecting the coupling point C5 where the first link 12 and the fixing bracket 93A are coupled together to the first coupling point C1.

This results in inhibiting a large displacement of the center of gravity of the electric motor 15 in the up-down direction even when the male threaded rod 14 is displaced greatly in its axial direction. Accordingly, the electric motor 15, which is an article having a comparatively large mass, can be inhibited from being displaced greatly.

(1d) When the cushion frame 7 is in the regular posture, the first coupling point C1 is located above the third coupling point C3, and when the cushion frame 7 is in the comfort-providing posture, the first coupling point C1 is located below the third coupling point C3. This results in increase in an angle of pivotal movement of the second link 13 about the first coupling point C1, thus enabling the cushion frame 7 to be tilted greatly when it is in the comfort-providing posture.

(1e) The second link 13 and the fourth link 17 are configured to be movable as one piece with the first coupling member 73. Thus, even when a large load acts on the side where the second side frame 72 is located, energy of such load is also transmitted to the side where the first side frame 71 is located via the first coupling member 73. This results in dispersing the load, thus enabling securement of a sufficient rigidity.

Other Embodiments

The fixing brackets 93A to 93D according to the above-described embodiment are provided on the corresponding movable rails 92. However, the present disclosure is not limited thereto. For example, in a configuration without the sliding devices 9, the fixing brackets 93A to 93D may be fixed to the vehicle directly or indirectly.

In the above-described embodiment, the truss structure in which the male threaded rod 14 is located below the first coupling point C1 is employed. However, the present disclosure is not limited thereto. For example, a truss structure in which the position of the first link 12 is interchanged with that of the male threaded rod 14 may be employed.

In the above-described embodiment, the third coupling point C3 where the second link 13 and the cushion frame 7 are coupled together is located between the first coupling point C1 and the second coupling point C2 in the second link 13. However, the present disclosure is not limited thereto.

For example, a configuration may be employed in which the third coupling point C3 where the second link 13 and the cushion frame 7 are coupled together coincides with the second coupling point C2. With such a configuration, the bending moment is not generated in the second link 13 or the male threaded rod 14.

In the above-described embodiment, the second link 13 and the fourth link 17 are configured to be movable as one piece with the first coupling member 73. However, the present disclosure is not limited thereto. For example, a configuration may be employed in which at least one of the second link 13 or the fourth link 17 is coupled to the first coupling member 73 so as to be rotatable relative thereto.

The second link 13 according to the above-described embodiment is coupled to the cushion frame 7 via the first coupling member 73. However, the present disclosure is not limited thereto. For example, a configuration may be employed in which the second link 13 is directly coupled to the cushion frame 7.

In the above-described embodiment, when the cushion frame 7 is in the regular posture, the first coupling point C1 is located above the third coupling point C3, and when the cushion frame 7 is in the comfort-providing posture, the first coupling point C1 is located below the third coupling point C3. However, the present disclosure is not limited thereto.

In the above-described embodiment, the lifter mechanism is provided. However, the present disclosure is not limited thereto. For example, a configuration without the lifter mechanism may be employed. Alternatively, a configuration may be employed in which at least one of the lifter mechanism or the posture-changing mechanism 11 is provided on the side where the second side frame 72 is located.

The electric motor 15 according to the above-described embodiment is rotatably supported by the first link 12 or the fixing bracket 93A. However, the present disclosure is not limited thereto. For example, a configuration may be employed in which the electric motor 15 is rotatably supported by the second link 13 and in which a leading end part of the male threaded rod 14 is rotatably coupled to the first link 12 or the fixing bracket 93A.

In the above-described embodiments, the vehicle seat according to the present disclosure is applied to the automobile. However, application of the disclosure disclosed herein is not limited thereto. The present disclosure is also applicable to, for example, a seat used in vehicles, such as railroad vehicles, ships, or aircraft, and to a stationary seat used in theaters, at home, or in other places.

Moreover, it is sufficient that the present disclosure be consistent with the gist of the disclosure described in the above-described embodiments, and the present disclosure is not limited to the above-described embodiments. Therefore, a configuration may be employed in which at least two embodiments among the above-described embodiments are combined together or in which any of the elements shown in the drawings or the elements described with reference numerals is removed in the above-described embodiments.

What is claimed is:

1. An easy chair comprising:

a cushion frame; and a posture-changing mechanism configured to displace the cushion frame between a comfort-providing posture in which a front end side of the cushion frame is raised to be higher than a rear end side thereof and a regular posture in which the front end side is lower than that in the comfort-providing posture, the posture-changing mechanism including:

- a first link;
- a second link;
- a male threaded rod; and
- an electric motor configured to rotate a nut that is threadedly engaged with the male threaded rod, wherein a first longitudinal end of the first link is rotatably coupled to a fixing bracket, a second longitudinal end of the first link and a first longitudinal end of the second link are rotatably coupled to each other at a first coupling point, a second longitudinal end of the second link and a first longitudinal end of the male threaded rod are rotatably coupled to each other at a second coupling point, the electric motor is rotatably supported by the first link or the fixing bracket at a support point, a shape formed by connecting the support point, the first coupling point, and the second coupling point to each other is always a triangle, the cushion frame is coupled to the second link via a coupling member, and the second link and the cushion frame are coupled together at a third coupling point located between the first coupling point and the second coupling point in the second link.

2. The easy chair according to claim 1, wherein the cushion frame includes:

a first side frame that is arranged on a first end side in a seat width direction and that extends in a seat front-rear direction;

a second side frame that is arranged on a second end side in the seat width direction and that extends in the seat front-rear direction; and the coupling member that extends in the seat width direction and that couples the first side frame and the second side frame to each other, the posture-changing mechanism is arranged on the first end side, a third link, a fourth link, and a second fixing bracket are provided on the second end side, a first longitudinal end of the third link is rotatably coupled to the second fixing bracket, a second longitudinal end of the third link and a first longitudinal end of the fourth link are rotatably coupled to each other, and the second link and the fourth link are configured to be movable as one piece with the coupling member.

3. The easy chair according to claim 1, wherein the electric motor is supported by the first link, the first link and the fixing bracket are coupled together at a fourth coupling point, and the support point is located on a same side as the fixing bracket relative to a midpoint of a line segment connecting the fourth coupling point to the first coupling point.

4. The easy chair according to claim 1, wherein the second link and the cushion frame are coupled together at the third coupling point, the first coupling point is configured to be located above the third coupling point when the cushion frame is in the regular posture, and the first coupling point is configured to be located below the third coupling point when the cushion frame is in the comfort-providing posture.

5. A vehicle seat comprising:

a cushion frame; and a posture-changing mechanism configured to displace the cushion frame, wherein the posture-changing mechanism includes:

a first link;

a second link;

a male threaded rod; and an electric motor configured to displace the male threaded rod, a first longitudinal end of the first link is rotatably coupled to a specified fixing portion, a second longitudinal end of the first link and a first longitudinal end of the second link are rotatably coupled to each other at a first coupling point, a second longitudinal end of the second link and a first longitudinal end of the male threaded rod are rotatably coupled to each other at a second coupling point, the electric motor is rotatably supported by the first link at a support point, a shape formed by connecting the support point, the first coupling point, and the second coupling point to each other is always a triangle, and the second link and the cushion frame are coupled together at a third coupling point located between the first coupling point and the second coupling point in the second link.

* * * * *